Nov. 6, 1934.          P. H. CHASE          1,980,037
SIGNAL
Filed March 28, 1931          6 Sheets-Sheet 1

Philip H. Chase,
Inventor.
Dela V. Haynes,
Attorney.

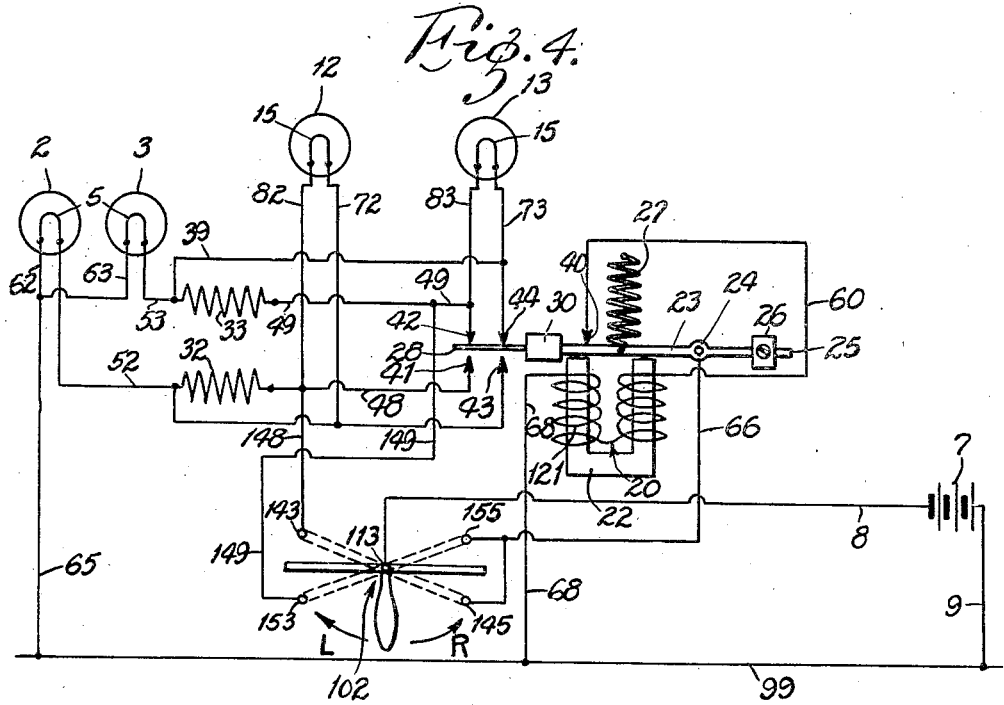
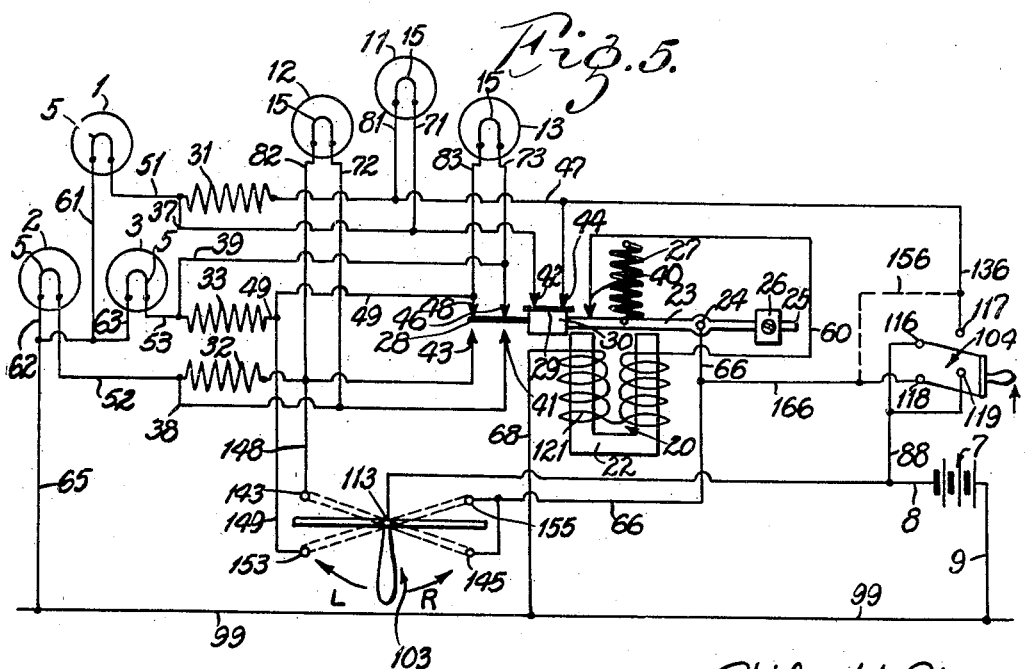

Nov. 6, 1934.   P. H. CHASE   1,980,037
SIGNAL
Filed March 28, 1931   6 Sheets-Sheet 3

Philip H. Chase,
Inventor.
Delos G. Haynes,
Attorney.

Nov. 6, 1934.  P. H. CHASE  1,980,037
SIGNAL
Filed March 28, 1931   6 Sheets-Sheet 4
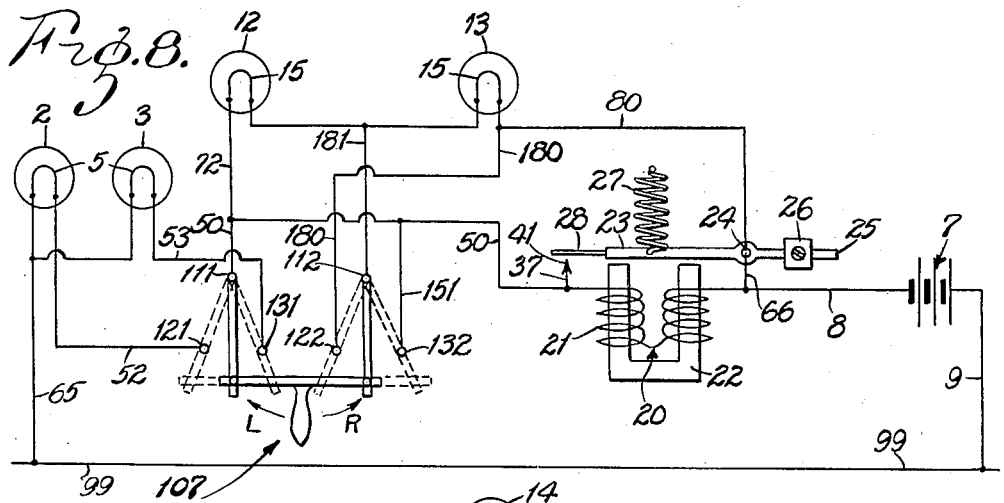
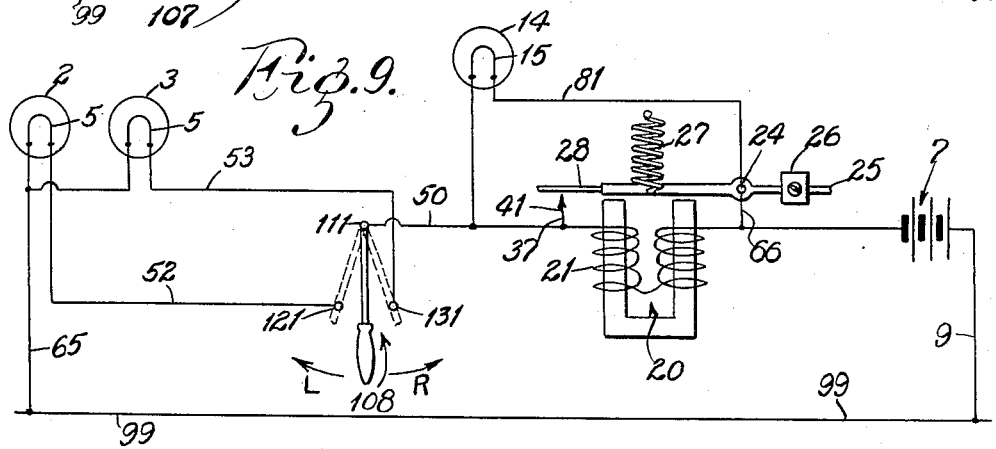
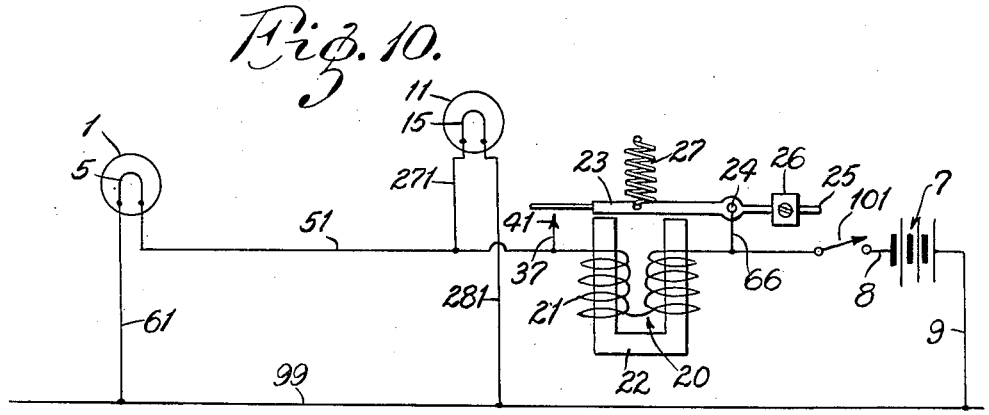

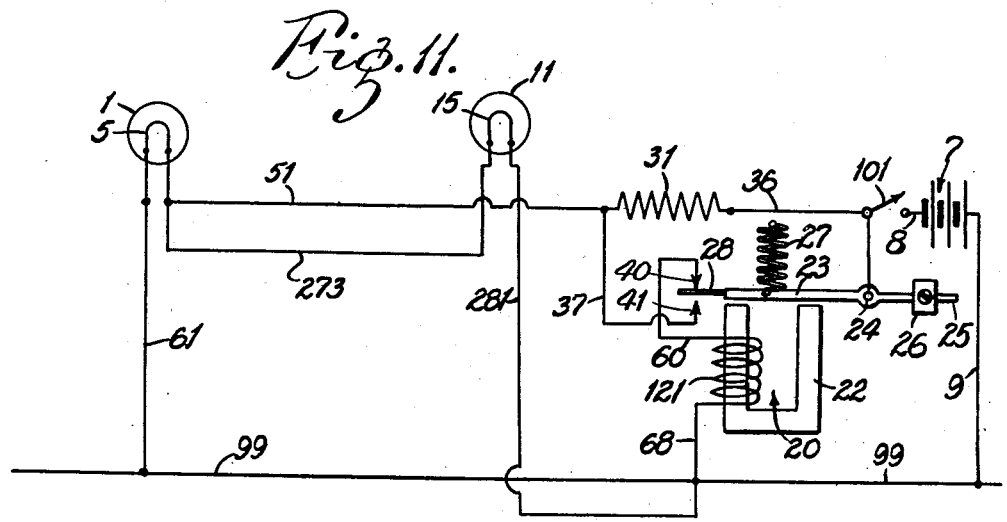
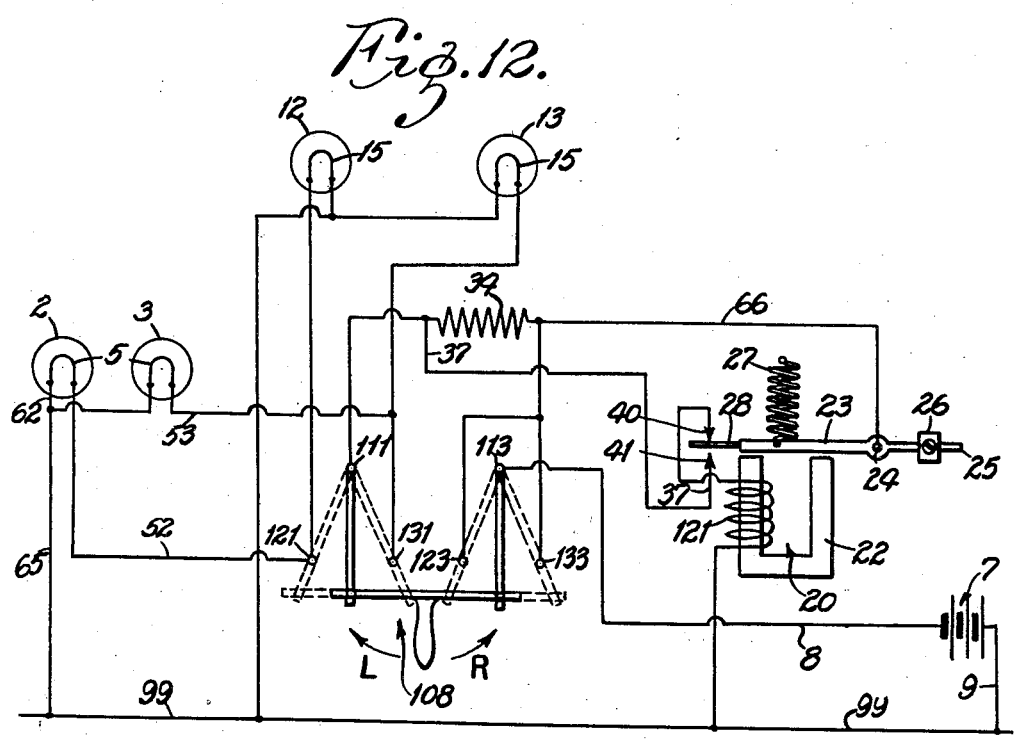

Nov. 6, 1934.  P. H. CHASE  1,980,037
SIGNAL
Filed March 28, 1931  6 Sheets-Sheet 6

Philip H. Chase,
Inventor.
Delos G. Haynes
Attorney.

Patented Nov. 6, 1934

1,980,037

UNITED STATES PATENT OFFICE 1,980,037

SIGNAL

Philip H. Chase, Bala-Cynwyd, Pa.

Application March 28, 1931, Serial No. 526,010

13 Claims. (Cl. 177—311)

This invention relates to an electric light signal system and apparatus therefor, and with regard to certain more specific features to a signal system for use in motor vehicles.

Among the several objects of my invention may be noted the provision of a more effective "stop" and/or "turn" signal; the provision of a signal light which by a constantly varying light intensity more quickly attracts attention; the provision of a pilot lamp which indicates the operation and condition of the system; the provision of means for varying signal lamp and pilot lamp intensities without interrupting the signal circuit; and the provision of means for continued signal lamp operation in the event of burn-out of the pilot lamp and/or the stoppage of the apparatus for varying the light intensity. Other objects will be in part obvious and in part pointed out hereinafter.

The invention accordingly comprises the elements and combination of elements, features of construction, and arrangements of parts which will be exemplified in the structure and circuits hereinafter described, and the scope of the application of which will be indicated in the following claims.

In the accompanying diagrams, in which are illustrated several of various possible embodiments of the invention, Fig. 1 illustrates one form of the invention showing certain series connections;

Fig. 4 illustrates an embodiment of the invention in which two signal lamps and two pilot lamps are used;

Fig. 5 is a view similar to Fig. 4 showing an embodiment including a third signal lamp and a third pilot lamp;

Fig. 6 illustrates another embodiment of the invention having provision for selective operation of two signal lamps and two pilot lamps using a single resistor;

Fig. 7 is a view similar to Fig. 6 showing an alternative form of the embodiment of Fig. 6;

Fig. 8 shows a two-lamp selective system using a series contactor, similar to that used in Fig. 1;

Fig. 9 shows a system similar to Fig. 8 but illustrating one pilot light to indicate the operation of two signal lamps;

Fig. 10 is a view similar to Fig. 1 but showing a pilot lamp connected in parallel with the signal lamp, instead of in series;

Fig. 11 is a view similar to Fig. 3 but shows a pilot lamp connected in parallel with the signal lamp instead of in series;

Fig. 12 shows the application of the principles of Figs. 10 and 11 to systems illustrated in Figs. 4 to 9; and, Fig. 13 is a perspective view of a vehicle showing the application of one form of the invention thereto.

Similar reference characters indicate corresponding parts throughout the several views of the drawings.

It is known practice to mount on the rear of a motor vehicle an electric "stop" signal which is lighted upon the application of the brakes, by the closing of a switch actuated from a foot brake mechanism. It thus gives a signal often anticipatory of the slowing and complete stopping of the vehicle. Such "stop" light signals are usually contained in and/or adjacent to the electric rear light housing, and often are the same color as the rear lamp.

Consequently, the efficacy of the usual "stop" light signal is greatly reduced, particularly at night, because once it is lighted it is usually similar in appearance to the rear light and does not continue to give an unmistakably distinctive signal warning that the vehicle is slowing or stopping. In heavy traffic, and at night, changes in the speed of vehicles are often more difficult to appraise and adequate notice of such changes is then particularly of importance.

The practice of signalling "left" and "right" turns by hand is little observed and when done often escapes notice, or is not understood, because there is no generally accepted code of signals. Such hand signals are usually inconvenient to the driver of a closed vehicle, particularly in inclement weather. Electric "turn" signals of the usual types are subject to similar difficulties as the "stop" light and may even increase the confusion of signals.

The provision of means for effecting flickering or blinking "stop" and "turn" light signals can be utilized to secure an unmistakable warning signal different from the tail light, but these results have often been secured at the expense of greatly added complication and greater liability of impairment of operation of the signal devices, and, among certain other disadvantages omit means indicating to the vehicle driver the operation and condition of the signal system.

The present invention secures the advantages of a controlled signal of constantly varying intensity, by relatively simple apparatus, and provides for the inclusion of pilot lamps under the eye of the driver which indicate the operation and condition of the signal system.

It is to be understood that the method and apparatus of the present invention is useful in other applications than to motor vehicles; for example, on crossing gates, traffic signals, switchboard signals and the like wherein similar requirements may exist.

Figure 1:
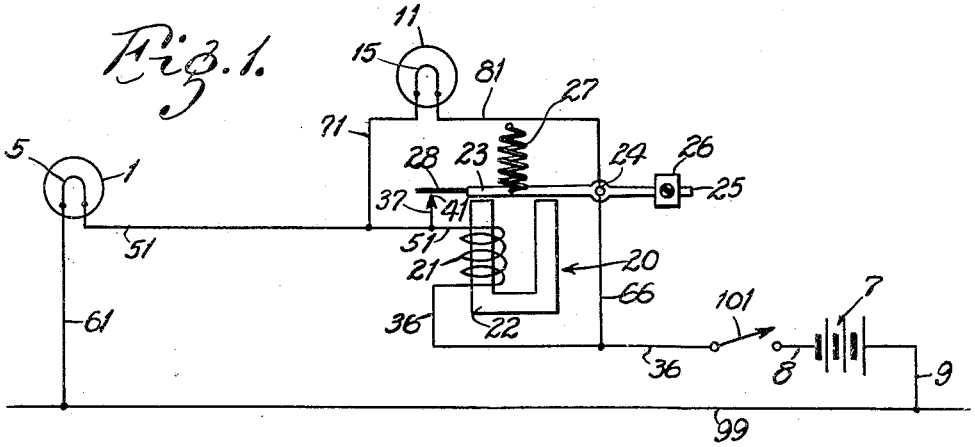

Referring now more particularly to Fig. 1, there is illustrated at numeral 1 an electric signal lamp with filament 5, connected by wire 51, in series with coil 21, wire 36, switch 101, and wire 8 to a battery 7. The circuit is completed by wires 9, 99 and 61. For example, as applied to a motor vehicle, the signal lamp 1 may be a fifteen or twenty-one (rated) candle power, six to eight volt tungsten filament automobile lamp; the switch 101, as is known, may be actuated by the footbrake mechanism to close the switch when the brake pedal is depressed. The battery 7 may be a lead storage battery, and the wire 99 may be replaced by the metal frame of the vehicle.

There is also provided a contactor device or vibrator 20, illustrated diagrammatically, which comprises the series coil 21 wound about a magnetic core 22, an armature 23, pivoted at 24 and associated with the magnet 22 and having an extension 25, on which is mounted an adjustable weight 26. The armature is normally retracted from the core 22 by a spring 27. A wire 66 connects the armature to wire 36. A portion of, or extension of the armature 28 is adapted to make contact with a contact 41 when the armature moves toward the core 22 and thereby short-circuits the coil 21 through wire 66, armature 23, armature extension 28, contact 41 and wire 37.

An electric pilot lamp 11, with filament 15, is connected in parallel with the coil 21 by the wires 71 and 81. The pilot lamp, as applied to a motor vehicle, may be mounted on the dash or other suitable place visible to the vehicle driver and may be, for example, a three (rated) candle power, six to eight volt tungsten filament automobile lamp. This pilot lamp is preferably mounted back of a lens or glass of the same color and shape as that of the signal light 1.

Upon the closing of the switch 101, current from the battery 7 passes through the series circuit 8, 36, 21, 51, 5, 61, 99 and 9, with a partial parallel path through the wire 81, the pilot lamp 11 and wire 71. The resistance of the series coil 21 is made of such a value that under this condition approximately one-half of the total voltage is impressed on the filament 5 of the signal lamp 1, the remainder of the voltage of the battery being absorbed (neglecting the small voltage drop due to wire and contact resistance) by the voltage drop through the coil 21 in parallel with the pilot lamp 11. This will be referred to hereinafter as condition A.

Immediately, however, the armature 23 is attracted by the magnetic flux passing through it and the core and the air gap or gaps. The restraining force of the spring 27 is overcome, the armature 23 moves downward and the armature extension 28 contacts with contact 41 and thereby short-circuits the coil 21 and the pilot lamp 11, so that substantially all the signal lamp current passes through said short-circuiting path 66, 24, 23, 28 and 37. During the interval that this short-circuit exists the full battery voltage (neglecting the small voltage drop through the wires and contacts) is impressed upon the filament 5 of the signal lamp 1. This will be referred to hereinafter as condition B.

Immediately upon the establishing of the short-circuit of coil 21, the magnetic flux through the core 22 and armature 23 rapidly decreases, the spring 27 retracts the armature and the short-circuit of coil 21 is opened at the contact 41. Thereupon the circuit connections become the same as at the instant when the switch 101 was closed, and as long as this switch remains closed this same cycle of operation repetitively will take place.

It is therefore apparent that during condition A the signal lamp will light to partial brilliancy and during condition B it will light to full brilliancy, while the pilot lamp 11 will light to partial brilliancy during condition A and will be dark during condition B; and these cycles of variations in brilliancy will continue as long as the switch 101 remains closed.

The frequency of these cycles of operation is determined by the characteristics of the contactor device or vibrator 20, depending particularly upon the retractive force of the spring 27 and the moment of inertia of the armature 23 and the weight 26. These elements can readily be constructed and adjusted so that the frequency of the armature movement through a cycle of operation will be the desired value. As applied to existing commercial types and sizes of automobile lamps, the number of cycles of operation should preferably be between two and ten per second, because of the relation of persistence of vision and lag in filament incandescence and cooling to desirable variability of light from the signal lamp.

The function of the contactor herein described can be performed by equivalent means, such, for example, as by a relay actuated by contacts on a clock escapement, or by contacts actuated by a motor or engine.

It is apparent that with the apparatus and system hereinabove described there is secured a constantly-varying signal which is distinctive and affords a superior warning during its operation. The resistance of the series coil 21 can be chosen to produce the desired voltage change cycle on the signal lamp during the operation cycle and thereby produce a wide or narrow variation in light intensity in order on the one hand to avoid a variation great enough to be objectionable (for example, to other drivers in the case of motor vehicles) and on the other hand to secure sufficient variation to attract attention. Experiment shows that with automobile type of lamps, a voltage variation on the signal lamp from 3 to 6 volts, with a consequent variation on the pilot lamp from 0 to 3 volts, is suitable, though a smaller variation than fifty per cent of the full voltage is sufficient under many conditions.

It is preferable for the rated candle power of the pilot lamp 11 to be less than one-fourth, or perhaps less than that of the signal lamp, first, because in a pilot lamp very little light volume is ordinarily required, particularly when the pilot lamp is properly equipped with lens, or glass, and enclosure, and second, to afford more effective signal operation under every abnormal condition, as described hereinafter. However, it will be understood that the pilot lamp, under some conditions may be of a lower rated voltage than that of the signal lamp and/or may be of the same rated candle power as the signal lamp, without loss of the advantages described herein.

Under abnormal conditions, particularly in the event of a lamp burn-out or an open circuit in some portions of the signal circuit, the system of my invention greatly assures the continued effectiveness of the signal. Further, in the event of practically any type of failure of the signal system, a change from the normal "flickering" action of the pilot lamp immediately indicates that some fault has developed.

It is apparent from Fig. 1 that neither the burn-out of the pilot lamp, nor the open-circuiting of the wires to it, nor the failure of the contactor device or vibrator to operate will extinguish the signal lamp, because none of these faults opens the main circuit from the battery through the switch to the signal lamp.

In the event of a burn-out of the signal lamp, or the open-circuiting of any of the wires 8, 36, 51, 61, 99 or 9, or failure of the switch 101 to close the circuit when actuated, the pilot lamp will, by its remaining dark when said switch is actuated, indicate at once that the signal system is inoperative.

In the event of failure of the contactor device or vibrator to operate when the switch 101 is actuated, the pilot lamp will either light to a constant brilliancy corresponding to the voltage across coil 21 in case the contactor contacts are open as under condition A, or will remain dark in case the contactor contacts are closed as under condition B. In neither event is the circuit to the signal lamp broken and therefore the signal lamp will be lighted either at partial or full brilliancy.

It is therefore apparent that constant indication of proper operation of the signal system is afforded by the normal pilot lamp action and immediate indication of failure or improper operation of the system is unmistakably given by changed pilot lamp action. In many applications such indications are of great importance. For example, assurance of the integrity of the signal system on a motor-vehicle is valuable to the driver, because of the dependence placed on signalling systems, particularly under heavy traffic conditions.

Figure 2:
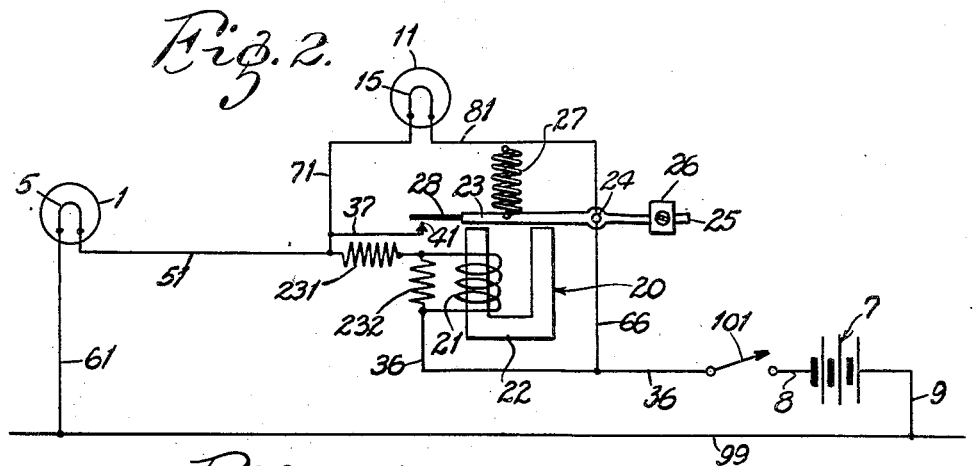
Fig. 2 is similar to Fig. 1, but shows an embodiment inclusive of certain auxiliaries.

Under some conditions it may be desirable to have the contactor coil 21 connected in series with a resistor such as is indicated in Fig. 2 by numeral 231 and/or coil 21 may be shunted by a resistor such as is indicated in Fig. 2 by numeral 232. The use of such series and shunt resistors, for example, permits the utilization of one contactor coil in many signal applications requiring different lamp voltages and currents such as a pilot lamp constructed for a rated voltage less than that of the signal lamp and connected across the terminals either of resistor 231 or 232 instead of across both of them.

Figure 3:
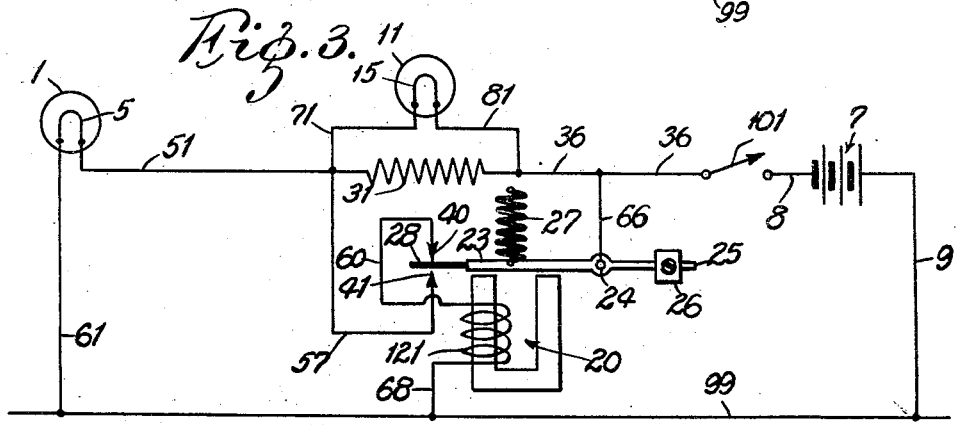
Fig. 3 illustrates another embodiment showing certain shunt connections in contradistinction to certain series connections of Fig. 1.

Another embodiment of my invention is illustrated in Fig. 3, in which the contactor coil 121 is of the shunt type instead of the series type illustrated in Figs. 1 and 2. The resistor 31, together with the parallel-connected pilot lamp 11, in series with the signal lamp 1 determines the voltage impressed on said signal lamp under condition A as does the series coil 21 and pilot lamp 11 of Fig. 1.

Upon the closing of switch 101 (condition A) in addition to the current passing through resistor 31 and pilot lamp 11 (shown in full parallel but may be in partial parallel) into wire 51 and signal lamp 1, the current for the shunt coil 121 passes from wire 36 through wire 66, armature 23, armature extension 28, contact 40, wire 60, shunt coil 121 and wire 68 to the return side of the circuit.

By the attraction of the armature 23, the restraining force of spring 27 is overcome, the armature 23 moves downward, contact is made between armature extension 28 and contact 41, and also contact is broken between armature extension 28 and contact 40. The contact between armature extension and contact 41 short-circuits resistor 31 and pilot light 11 thus establishes condition B.

Immediately upon the opening of the circuit to the shunt coil 121 by the aforesaid breaking of contact between armature extension 28 and contact 40, the magnetic flux through the coil 22 and armature 23 rapidly decreases, the spring 27 retracts the armature and contact is re-established between armature extension 28 and contact 40 and contact is broken between armature extension 28 and contact 41. Thereupon the circuit connections become the same as at the instant when the switch 101 was closed (condition A) and as long as this switch remains closed this same cycle of operation will take place repetitively.

Figure 4 illustrates an embodiment of the invention in which there are two signal lamps designated by numerals 2 and 3, and corresponding pilot lamps 12 and 13, with provisions for selection of one or the other signal lamp, either by manual operation or automatically as conditions may require. In this Fig. 4 is illustrated control by a manually-operated switch 102 such as might, for example, be used in a motor-vehicle for indicating left and right turns.

When switch 102 is closed in either left or right rotated position, the contactor 20 is energized from wire 8 through contacts 113, 145, or 113, 155 respectively. In the left position switch 102 also energizes signal lamp 2 through contacts 113, 143, wire 148, resistor 32 and wire 52. Alternatively, in the right position switch 102 also energizes signal lamp 3 through contacts 113, 153, wire 149, resistor 33 and wire 53. The pilot lamps 12 and 13 are connected in parallel with their respective resistors 32 and 33 by wires 72, 82 and 73, 83 respectively. Armature extension 28 is insulated from the armature 27 by insulation 30 and contact 40 makes contact direct with the armature.

In this embodiment if the switch 102 is closed in left position, for signal lamp 2 and associated circuit condition A is thereupon initially established, followed by the movement of the armature which establishes condition B by the closing of the contacts 41, 43. If, however, the switch 102 is closed in the right position, for signal lamp 3 and associated circuit condition B is thereupon initially established, followed by movement of the armature which establishes condition A by the opening of contacts 42, 44. In either case the signal lamp and associated pilot lamp pass repetitively through conditions A and B as hereinabove described as long as switch 102 remains closed.

It is apparent that selection of more than two signal lamps can be effected by this same method, by utilizing a selector switch similar to switch 102 but with an appropriate number of contacts.

Figure 5 illustrates an embodiment which includes the two-lamp selective features of Fig. 4, for signal lamps 2 and 3 with their associated pilot lamps 12 and 13, and also includes a third signal lamp 1 with associated pilot lamp 11 which can be operated independently, either coincidently or non-coincidently. This third signal lamp is energized by closing of switch 104 which connects from battery wire 8 through wire 88, switch contacts 116, 117, wire 136, wire 47, resistor 31 and wire 51 to signal lamp 1. The associated pilot lamp 11 is connected in parallel with resistor 31 by wires 71 and 81. Simultaneously through switch contacts 118, 119 the contactor 20 is energized through wires 166 and 66. An additional armature extension 29 provides for connecting the contacts 42 and 44 when the armature is retracted by spring 27.

It is apparent that by various arrangements of the contactor contacts 41, 43; 42, 44, and 46, 48, condition A or condition B can be established for each of the signal lamps in either retracted or attracted position of the contactor armature.

The system illustrated in Fig. 5 would be applicable, for example, to motor vehicles, where signal lamp 1 would act as a "Stop" signal, with switch 104 actuated by the foot brake mechanism; and signal lamps 2 and 3 would act as "left" and "right" turn signals, with switch 103 manually actuated by the driver.

In event that it be desired to have lamp 1 lighted whenever either lamp 2 or 3 is lighted, wire 156 (shown dotted) would connect wire 166 to 136 and switch 104 would become only singlepole for contacts 118 and 119 only, as contacts 116 and 117 would then become superfluous. Then, whenever switch 103 is closed in either left or right position, wire 136 and thereby signal lamp 1 also would be energized.

Figure 13:
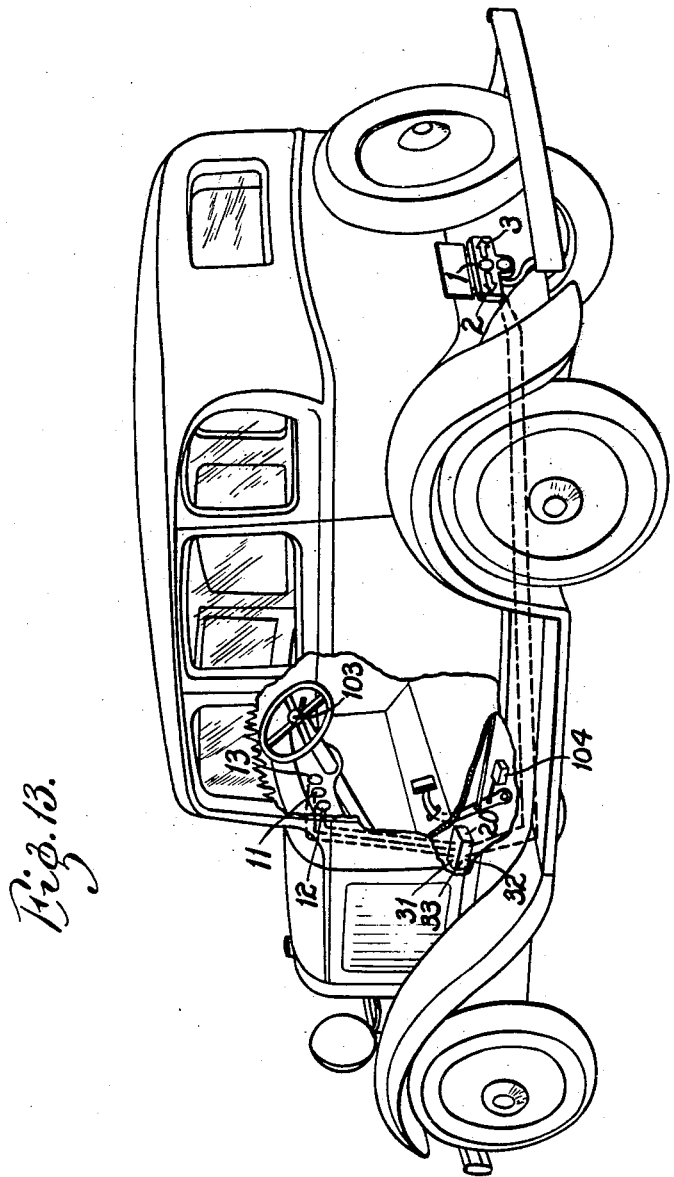

The signal system of Fig. 5, as applied to a vehicle, is illustrated in Fig. 13.

The signal systems of Figs. 4 and 5 therefore provide for operation of two or more signal lamps with their respective pilot lamps, which realizes for each signal lamp the operating advantages and effectiveness secured in the single signal lamp embodiments of Figs. 1 to 3, but without duplication of the contactor.

Figure 6 illustrates another embodiment of the invention in which there are two signal lamps 2 and 3 and corresponding pilot lamps 12 and 13 with provisions for selective operation, but only one resistor. The signal system is controlled by three-pole double-throw switch 105 (shown in open position), which when closed in either left or right position energizes the contactor 20 and series resistor 34. In the left position, switch 105 also connects thereto signal lamp 2 and pilot lamp 12, and in the right position signal lamp 3 and pilot lamp 13.

When switch 105 is closed in the left position the battery 7 is connected to wire 136 through switch contacts 113, 123, and simultaneously signal lamp 2 and pilot lamp 12 are connected to resistor 34 by the connection to wire 50 of wires 52 and 72 respectively through switch contacts 111, 121 and 112, 122. Conversely when switch 105 is closed in the right position the battery is connected to wire 136 through switch contacts 113, 133, and simultaneously signal lamp 3 and pilot lamp 13 are connected to resistor 34 by the connection to wire 50 of wires 53 and 73 respectively through switch contacts 111, 131 and 112, 132. Thereupon, with switch 105 in either position, condition A is set up and the signal system including the connected signal light and pilot light, pass repetitively through conditions A and B as hereinabove described as long as switch 105 remains closed.

Another similar embodiment of a selective system with two signal lamps is illustrated in Fig. 7. The resistor 35 is connected by wires 48 and 49 respectively to contacts 42 and 41. The pilot lamps 12 and 13 are connected by common wire 80 to supply wire 66 from switch 106 and by wires 72 and 73 to the terminals of the resistor 35.

When switch 106 is closed in either right or left position, the contactor 20 is energized through wire 66 and alternately each end of resistor 35 is energized at full potential through contact 113, 123 or 133, wire 66, armature 23, armature extension 28 and through either contact 42 and wire 48 or contact 41 and wire 49. If the switch 106 is closed in the left position, then signal light 2 is energized through wire 152, contacts 111, 121 and wire 52. If switch 106 is closed in the right position, then signal light 3 is energized through wire 153, contacts 112, 132 and wire 53.

In this embodiment the one resistor 35 serves for either signal lamp and only the pilot lamp associated with the energized signal lamp is operative, because there is at all times zero potential across the other signal lamp. For example, in case switch 106 is in the left closed position, when the armature 23 is in the retracted position, full potential is applied to wire 48 and therefore to the signal lamp 2 and to the terminal of pilot lamp 12 connected to wire 72. Under this condition there is zero current flow through resistor 35 and therefore there is zero voltage across both pilot lamps 12 and 13; but when the armature 23 is in the attracted position full potential is applied to wire 49, current to signal lamp 2 passes through resistor 35, the corresponding potential drop will be impressed on pilot lamp 12 through wires 80 and 72, while there will still be zero potential difference on pilot lamp 13 connected to wires 80 and 73. Accordingly pilot lamp 2 will pass through cycles of partial brilliancy and darkness. Similar conditions, but reversed, will obtain with the switch 106 in the right closed position.

Figure 8 illustrates a two-lamp selective system, utilizing a series contactor coil 21 similar to Fig. 1. In this embodiment double pole double-throw switch 107 connects in the contactor circuit either signal lamp 2 or 3 and also short circuits that one of the pilot lamps 12 or 13 which is required to be inoperative. For example, in case switch 107 is closed in the left position, current through the contactor and wire 50 passes through contacts 111, 121 and wire 52 to signal lamp 2, and pilot lamp 13 is short circuited by wires 180 and 181 through contacts 112, 122; thus pilot lamp 12 is connected across contactor coil 21 through wires 50, 72, 181, 180 and 80. Similarly, in case switch 107 is closed in the right position, signal lamp 3 is energized through wire 50, contacts 111, 131 and wire 53, and pilot lamp 13 is connected across contactor coil 21 by wire 151, contacts 112, 132, and wires 181 and 80. It is apparent the pilot lamp selecting means of Figs. 6 and 8 are interchangeable.

In Figure 9 is illustrated another two-lamp selective system similar to Fig. 8, but with one pilot light to indicate the operation of both of the signal lamps. The common pilot lamp 14 is connected across the series contactor coil 21.

Figure 10 illustrates a single lamp signal system similar to Fig. 1 except that the pilot lamp 11 is connected in parallel with the signal lamp 1, instead of in series. Wire 271 connects to wire 51 and wire 281 connects to the return side of the circuit 99. Consequently both the signal lamp 1 and pilot lamp 11 pass through the cycles of partial voltage and full voltage simultaneously instead of as in Figs. 1-9.

The pilot lamp of Fig. 10 affords indication of both proper and improper operation of the signal system. In the event of a signal lamp burn-out or a break in wire 51, the pilot lamp will (particularly if of much smaller rated candle-power than the signal lamp) have a considerably decreased variation of brilliancy, because the current through coil 21 will be reduced to that taken by the pilot lamp alone. Therefore the voltage drop will be correspondingly reduced when contact 41 is open, and the voltage across the pilot lamp under condition A will be nearer full voltage than under normal conditions.

Figure 11 illustrates another single lamp signal system similar to Fig. 3 except that, as in Fig. 10, the pilot lamp 11 is connected in parallel with the signal lamp 1, instead of in series. Also the pilot lamp connection illustrated is different than that in Fig. 10 in that the wire 273 is connected to wire 51 at the signal lamp terminal instead of near the series resistor 31. The pilot lamp connection of Fig. 11 results in an indication of open-circuit condition by darkness of the pilot lamp, except for a burn-out of the signal lamp 1 or open-circuit of wire 61. The pilot lamp connection of Fig. 10 may be used with the signal lamp-contactor-resistor connection of Fig. 11 and vice-versa.

The parallel connection of the pilot lamp illustrated in Figs. 10 and 11 can also similarly be used in the various signal systems illustrated in Figs. 4-9 inclusive. As applied to Figures 6 and 8, one pole of switches 105 and 107 respectively with contacts 112, 122 and 132 would be omitted. This is illustrated in Fig. 12 which is similar to Fig. 6 except for the modifications to pilot lamp connections and the use of a double pole switch 108.

In the various embodiments condensers of appropriate size may be connected across the contacts to minimize sparking. This is not an essential part of the invention and is a well known expedient, particularly where the contact breaks a highly inductive circuit. Whether or not a condenser be used depends upon the usual factors governing proper design.

It is to be understood that the systems herein described are operative to signal with any or all pilot lights eliminated. It is clear that the signal systems will operate and provide the continuous variation in intensity of the signal lamp without the pilot lamps. The omission of the pilot lamps loses the advantage of continual indication that the system is operating and the immediate indication of its becoming partly or wholly inoperative due to some fault or lamp burn out, but in some applications this is allowable.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In an electrical signal means for vehicles, signal means visible from the exterior of the vehicle, automatic means for varying the voltage drop across the signal means, said automatic means comprising a circuit breaking armature, a resistance, and an electromagnet cooperating with said armature, said circuit breaker being connected in parallel to said resistance to periodically short-circuit said resistance under influence of current through the electromagnet, said resistance being sufficiently low that when it is not short-circuited said signal means is lighted to visible brilliancy and when short-circuited said signal means is lighted to greater brilliancy.

2. In a signal system, signal means normally operating at full voltage, pilot means in parallel therewith, circuits for energizing said signal and pilot means, a series resistor in series with the signal means, and means for periodically opening and closing a short circuit across said resistor whereby upon opening the short circuit the signal voltage is decreased but is sufficient for visibility of the signal means.

3. In a signal system, signal means, a circuit for energizing said signal means, a series resistor in series with the signal means, and means for periodically opening and closing a short-circuit across said resistor whereby upon opening the short-circuit the signal means voltage is decreased but is sufficient for visibility of the signal means, the variation of the difference between the circuit input and the signal means input being no greater than the losses in the series resistor when the short circuit thereacross is open.

4. In a signal system, signal means, a circuit for energizing said signal means, means for reducing energy delivered to the signal means and simultaneously the energy input to the circuit, and means for periodically effecting said reduction whereby the signal voltage is periodically decreased but which is at all times sufficient for visibility of the signal means.

5. A signal circuit for motor vehicles comprising a signal lamp, a series resistor, means periodically short-circuiting said series resistor, said circuit being characterized by the fact that the energy input thereto varies between the value when said resistor is short-circuited and a lesser value sufficient to cause the signal lamp to burn at reduced but visible intensity.

6. In an electrical signal circuit for vehicles, signal means visible from the exterior of the vehicle, pilot means visible from the interior of the vehicle for indicating the condition of the circuit, automatic means for periodically varying the voltage drop across said signal means when the circuit is energized, a resistance in series with the signal means, said pilot means being connected in parallel with said resistance, said resistance being sufficiently low that when it is in series with the signal means said signal means is lighted to visible brilliancy, said automatic means comprising a short-circuiting armature across the resistance, and an electromagnet associated with said armature, whereby the visibility of the pilot is varied as said automatic means functions.

7. In an electrical signal circuit for vehicles, a signal lamp visible from the exterior of the vehicle, a pilot lamp visible from the interior of the vehicle for indicating the condition of the circuit, automatic means for periodically varying the voltage drop across said signal lamp when the circuit is energized, a resistance in series with the signal lamp, said pilot means being connected in parallel with said resistance, said resistance being sufficiently low that when it is in series with the signal lamp said signal lamp is lighted to visible brilliancy, said automatic means comprising a short-circuiting armature across the resistance and an electromagnet associated with said armature, said pilot lamp being adapted to vary its visibility as said automatic means functions, said pilot lamp being of a size with respect to the signal lamp that the pilot lamp has only a small effect upon the brilliancy of the signal lamp.

8. In an electric signal circuit, an electric signal lamp, an electromagnet, a coil for the magnet, said coil being connected in parallel with said signal lamp, a pilot means in series with said signal lamp, a resistance in parallel with the pilot means, and means breaking the circuit through said coil when the coil is energized and simultaneously short-circuiting said pilot means and said resistance, the circuit being characterized by the fact that when the short circuit is open, the signal lamp intensity is of an order adapted to be substantially visible.

9. In a signal system, signal means, pilot means in series therewith, circuits for energizing said signal and pilot means, a series resistor in series with the signal and in parallel with the pilot means, and means periodically opening and closing a short circuit across said resistor and pilot means whereby upon opening the short circuit the signal voltage is decreased but is sufficient for visibility of the signal means, and upon closing the short circuit the signal voltage is substantially the energizing circuit voltage.

10. In an electric signal circuit for vehicles, signaling means visible from the exterior of the vehicle, an electric element having a resistance in series with the signaling means, automatic means adapted to periodically short-circuit said element and pilot means connected in parallel with said element, said automatic means comprising an electromagnetic coil adapted to motivate said automatic means, said signaling means comprising a lamp, the lamp and the resistance being characterized by the fact that when the short circuit across the resistance is open, the signal lamp voltage shall be sufficient to cause the signal lamp to burn at an intensity which is substantially visible from other vehicles.

11. In an electric signal circuit for vehicles, an electric signal lamp visible from the exterior of the vehicle from other vehicles, an electric pilot lamp visible from the interior of the vehicle and automatic means adapted to alternately apply full-circuit voltage and partial-circuit voltage to said signal lamp, said automatic means coincidentally applying to said pilot light respectively zero voltage and partial-circuit voltage, a resistance in parallel with the pilot lamp, the signal lamp and the pilot lamp being characterized by the fact that when the partial-circuit voltage is applied to the signal lamp it shall be sufficient to cause the signal lamp to burn at an intensity visible from other vehicles.

12. A signal circuit for motor vehicles, comprising a signal lamp, a series resistor, a pilot lamp in parallel with the resistor, means periodically short-circuiting said series resistor and pilot lamp, said circuit being characterized by the fact that the energy input thereto varies between the value when said resistor and pilot lamp are short-circuited and a lesser value sufficient to cause the signal lamp to burn at reduced but visible intensity.

13. In an electric signal circuit for vehicles, signaling means visible from the exterior of the vehicle, an electric element having a resistance in series with the signaling means, automatic means adapted to periodically short-circuit said element and pilot means connected in parallel with said signaling means, said signaling means comprising a lamp, the lamp and the resistance being characterized by the fact that when the short circuit across the resistance is open, the signal lamp voltage shall be sufficient to cause the signal lamp to burn at an intensity which is substantially visible from other vehicles.

PHILIP H. CHASE.